United States Patent
Kujirai et al.

(10) Patent No.: US 7,088,025 B2
(45) Date of Patent: Aug. 8, 2006

(54) VARIABLE-RELUCTANCE RESOLVER AND ROTATIONAL ANGLE SENSOR USING SAME

(75) Inventors: Hiroyuki Kujirai, Tokyo (JP); Taiichi Miya, Tokyo (JP); Mutsumi Matsuura, Tokyo (JP); Nao Aoki, Tokyo (JP)

(73) Assignee: Minebea Co., Ltd., Nagano-ken (JP)

( * ) Notice: Subject to any disclaimer, the term of this patent is extended or adjusted under 35 U.S.C. 154(b) by 7 days.

(21) Appl. No.: 11/060,405

(22) Filed: Feb. 18, 2005

(65) Prior Publication Data

US 2005/0212511 A1    Sep. 29, 2005

(30) Foreign Application Priority Data

Mar. 26, 2004   (JP)   .............................. 2004-093763

(51) Int. Cl.
G01D 5/245    (2006.01)
G01B 7/30     (2006.01)
H02K 24/00    (2006.01)

(52) U.S. Cl. .................................. 310/168; 324/207.25
(58) Field of Classification Search ................ 310/168; 324/207.25

See application file for complete search history.

(56) References Cited

U.S. PATENT DOCUMENTS

| | | | | |
|---|---|---|---|---|
| 3,688,306 A | * | 8/1972 | Oishi et al. ..................... 341/15 |
| 3,705,343 A | * | 12/1972 | Ringland et al. ............ 323/348 |
| 4,255,682 A | * | 3/1981 | Toida et al. ................. 310/168 |
| 4,604,575 A | * | 8/1986 | Shimizu et al. ......... 324/207.18 |
| 4,631,510 A | * | 12/1986 | Nagarkatti et al. .......... 336/135 |
| 5,300,884 A | * | 4/1994 | Maestre .................. 324/207.25 |
| 5,444,368 A | * | 8/1995 | Horber ................... 324/207.16 |
| 5,469,055 A | * | 11/1995 | Mueller et al. ......... 324/207.21 |
| 5,570,016 A | * | 10/1996 | Schroeder et al. ..... 324/207.25 |
| 5,754,042 A | * | 5/1998 | Schroeder et al. ..... 324/207.25 |
| 5,763,976 A | * | 6/1998 | Huard ......................... 310/168 |
| 6,552,453 B1 | * | 4/2003 | Ohiwa et al. ............. 310/68 B |
| 6,930,423 B1 | * | 8/2005 | Kitazawa .................... 310/168 |

FOREIGN PATENT DOCUMENTS

| | | | |
|---|---|---|---|
| EP | 1473548 | * | 11/2004 |
| JP | 60-152251 | * | 8/1985 |
| JP | 3-149014 | | 6/1991 |
| JP | 8-189805 | * | 7/1996 |
| JP | 2000-316266 | * | 11/2000 |
| JP | 2001-183169 A | * | 7/2001 |

* cited by examiner

*Primary Examiner*—Burton Mullins
(74) *Attorney, Agent, or Firm*—Bacon & Thomas, PLLC

(57) ABSTRACT

A variable-reluctance resolver includes a rotor and a stator. The rotor includes axially connected first and second rotor portions. The first rotor portion has n salient poles provided about a center axis at uniform angular intervals, where n is an arbitrary integer not less than 3. The second rotor portion has (n−1) salient poles provided about the center axis at uniform angular intervals. The stator has a plurality of magnetic poles provided on an inner circumferential surface thereof. An excitation coil and output coils for shaft angle multipliers of n× and (n−1)× are provided on the magnetic poles in order to output sine and cosine outputs having a phase difference of 90 degrees therebetween. A rotational angle sensor includes the VR resolver and a calculation section for calculating a resolver signal for a shaft angle multiplier of 1× from signals output from the VR resolver.

6 Claims, 6 Drawing Sheets

(OUTPUT OF 1X COIL)

(OUTPUT OF nX COIL)

VARIABLE-RELUCTANCE RESOLVER AND ROTATIONAL ANGLE SENSOR USING SAME

BACKGROUND OF THE INVENTION

1. Field of the Invention

The present invention relates to a variable-reluctance (VR) resolver used for, for example, measurement or control of rotational angle or position, and to a rotational angle sensor using the same.

2. Description of the Related Art

A variable-reluctance (VR) resolver, which includes a stator having an excitation winding and output coils wound around its magnetic poles, and a rotor having an arbitrary salient pole shape, outputs a two-phase signal including a SIN signal voltage and a COS signal voltage, which vary with the rotational angle of the rotor. Such a VR resolver must output a resolver signal whose shaft angle multiplier is 1× and which serves as a reference for detection of an absolute position. In the case where the stator and the rotor are assembled in a misaligned state; i.e., the center axis of the rotor is deviated from the center axis of the stator, output signal voltages, which vary with the rotational angle of the rotor, greatly deviate from the designed output signal voltages, whereby the accuracy of the resolver deteriorates considerably.

The accuracy deterioration occurs because of the following reason. In the case where the shaft angle multiplier of a resolver is 1×, the shape of the salient pole is determined to have a single peak within a single rotation (mechanical angle: 360 degrees) of an input rotary shaft. Therefore, the change in radius of the salient pole per unit rotational angle becomes small, and thus, the amounts of change in the output signal voltages per unit rotational angle become small. Accordingly, even a small center deviation between the stator and the rotor produces large errors in the output signal voltages.

Conventionally, an absolute-position detection apparatus which can solve the above-described problem has been proposed (see, for example, Japanese Patent Application Laid-Open (kokai) No. H03-148014). The absolute-position detection apparatus utilizes, in combination, a resolver whose shaft angle multiplier is 1× and in which the phase of a detection signal changes by 360 degrees when the rotary shaft rotates one turn (hereinafter referred to as "1× resolver") and a resolver whose shaft angle multiplier is n× and in which the phase of a detection signal changes by 360 degrees every time the rotary shaft rotates a 1/n turn (hereinafter referred to as "n× resolver"). In the apparatus, the 1× resolver detects a pole corresponding to the resolution (1/n turn), and the rotational angle position within the detected pole (an area corresponding to 1/n turn) is calculated on the basis of the detection signal from the n× resolver.

The term "shaft angle multiplier" refers to the ratio of an output electrical angle θe of a resolver to an actual input mechanical angle θm of the resolver, and in general, the mechanical angle θm is obtained through division of the output electrical angle θe by the shaft angle multiplier.

FIG. 5 is a block diagram of a conventional double-speed rotation detector which uses two resolvers.

FIG. 6 shows output characteristics of the conventional double-speed rotation detector of FIG. 5.

An input shaft 201, which is coupled to an object whose rotation is to be detected, is connected directly to an n× resolver 202 and indirectly to a 1× resolver 204, via a speed reducer 203 having a speed reduction ratio of 1/n. An output signal from the n× resolver 202 is passed through a synchronous detector 205 so as to remove an excitation frequency component from the output signal, and then converted to a digital signal by means of a resolver-digital (R/D) converter 207. The thus-obtained digital signal is input to a synthesizing circuit 209. Similarly, an output signal from the 1× resolver 204 is passed through a synchronous detector 206 so as to remove an excitation frequency component from the output signal, and then converted to a digital signal by means of a resolver-digital (R/D) converter 208. The thus-obtained digital signal is input to the synthesizing circuit 209.

The R/D converter 207 repeatedly outputs the same signal (a sawtooth signal which continues over an electrical angle of 360°) n times during a single turn (mechanical angle: 360°) of the input shaft.

The R/D converter 208 repeatedly outputs the same signal (a sawtooth signal which continues over an electrical angle of 360°) a single time during a single turn (mechanical angle: 360°) of the input shaft.

When sine-wave and cosine-wave output signals of each of the n× resolver 202 and the 1× resolver 204, which have a 90° phase difference therebetween, are represented by Va and Vb, and the rotational angle is represented by θ, the output signals Va and Vb are sine wave and cosine wave signals which undergo amplitude modulation in accordance with the rotational angle θ. However, since instantaneous values of the output signal voltages Va and Vb cannot be used as they are for calculation, the output signals Va and Vb undergo synchronous detection at the synchronous detectors 205 and 206, respectively, so as to remove the excitation frequency component therefrom. The thus-obtained signal voltages are converted to digital signals by means of the R/D converters 207 and 208.

On the basis of the digital signal output from the R/D converter 207, the synthesizing circuit 209 produces n triangular wave segments for a single period (mechanical angle: 360°) as shown in section (b) of FIG. 6, wherein each wave segment continues over a period of 2π/n. The period of 2π/n corresponding to an electrical angle of 360° is represented by a serial number, which serves as an identifier for the poles or wave segments. The maximum value of the triangular wave segment is 2π (rad: electrical angle).

Further, on the basis of the digital signal output from the R/D converter 208, the synthesizing circuit 209 produces a single triangular wave segment for a single period (mechanical angle: 360°) as shown in section (a) of FIG. 6, wherein the wave segment continues over a period of 2π (rad). The maximum value of the triangular wave segment is 2π (rad: electrical angle).

The characteristic charts of FIGS. 6(a) and 6(b) show the relation between a point on the characteristic chart for the 1× resolver and a corresponding pole on the characteristic chart for the n× resolver.

Even in the conventional apparatus which uses a 1× resolver and an n× resolver in combination, a detection signal output from the 1× resolver is still used as a reference. When a characteristic curve of a 1× digital signal obtained through R/D conversion of the output voltage signal of the 1× resolver is drawn, as shown in FIG. 6(a), its slope is small. This means that a small variation in input causes a large variation in output, so that output errors are easily generated. Moreover, when the shaft angle multiplier n of the n× resolver is increased (the number of salient poles is increased), a correct pole on the characteristic chart for the n× resolver may fail to be selected if the output of the 1× resolver does not change linearly, because of influence of errors. Therefore, the conventional apparatus cannot solve the problem involved in the conventional 1× resolver such that the detection signal is very likely to be influenced by errors.

In addition, since both a 1× resolver and an n× resolver are incorporated, the size of the apparatus increases. Moreover, since the resolvers are connected together via a speed reduction mechanism, operational malfunctions occur as a result of mechanical vibration, noise, and wear.

SUMMARY OF THE INVENTION

In view of the above drawbacks in a conventional apparatus, an object of the present invention is to provide a resolver which reduces an influence of the center deviation between a stator and a rotor and produces a high-accuracy 1× detection signal, as well as a rotational angle sensor using the same.

In order to achieve the above object, the present invention employs the following means for solution.

A VR resolver of the present invention is characterized in that a rotor includes first and second rotor portions, the first rotor portion has n salient poles provided about a center axis at uniform angular intervals, where n is an arbitrary integer not less than 3, the second rotor portion has (n−1) salient poles provided about the center axis at uniform angular intervals; and that a stator has a plurality of magnetic poles provided on an inner circumferential surface thereof, and an excitation coil and n× and (n−1)× output coils are provided on the magnetic poles in order to output sine and cosine outputs having a phase difference of 90 degrees therebetween.

In one embodiment of the present invention, the first and second rotor portions are formed on opposite sides on a plane including the center axis.

A rotational angle sensor of the present invention is characterized by comprising calculation means for calculating a 1× resolver signal from n× and (n−1)× resolver output signals, where n is an arbitrary integer not less than 3.

The rotational angle sensor of the present invention is characterized in that the sensor determines an absolute position from the 1× resolver signal calculated by means of the calculation means.

The rotational angle sensor of the present invention is characterized in that the calculation for determining an angle is based on the addition theorem in relation to sine (sin), which is a trigonometric function.

Specifically, the present invention provides the following as means for solution.

(1) A VR resolver comprising:

a rotor including first and second rotor portions, the first rotor portion having n salient poles provided about a center axis at uniform angular intervals, where n is an arbitrary integer not less than 3, the second rotor portion having (n−1) salient poles provided about the center axis at uniform angular intervals; and a stator having a plurality of magnetic poles provided on an inner circumferential surface thereof, an excitation coil provided on the magnetic poles, and output coils for shaft angle multipliers of n× and (n−1)× provided on the magnetic poles, the output coils outputting sine and cosine outputs which have a phase difference of 90 degrees therebetween.

(2) A VR resolver described in (1) above, wherein the first and second rotor portions are formed on opposite sides on a plane including the center axis.

(3) A rotational angle sensor comprising:

a VR resolver according to (1); and a calculation section which receives $\sin(n\theta)$ and $\cos(n\theta)$ signals output from the resolver output coils for the shaft angle multiplier of n× and $\sin((n-1)\theta)$ and $\cos((n-1)\theta)$ signals output from the resolver output coils for the shaft angle multiplier of (n−1)×, and calculates a resolver signal for a shaft angle multiplier of 1× through the following calculation and outputs the calculated resolver signal:

$$\sin(n\theta) \cdot \cos((n-1)\theta) - \cos(n\theta) \cdot \sin((n-1)\theta)$$
$$= \sin(n\theta - (n-1)\theta)$$
$$= \sin\theta.$$

(4) A rotational angle sensor described in (3) above, further comprising a resolver-digital conversion section for converting signals output from the calculation section to digital signals and converting a signal output from one of the resolver output coils to a digital signal; and a synthesizing section for receiving digital signals output from the resolver-digital conversion section, and synthesizing an absolute angle signal therefrom.

(5) A rotational angle sensor described in (3) above, wherein the calculation section receives $\sin(n\theta)$ and $\cos(n\theta)$ signals output from the resolver output coils for the shaft angle multiplier of n× and $\sin((n-1)\theta)$ and $\cos((n-1)\theta)$ signals output from the resolver output coils for the shaft angle multiplier of (n−1)×, and calculates a resolver signal for a shaft angle multiplier of (2n−1)× through the following calculation and outputs the calculated resolver signal:

$$\sin(n\theta) \cdot \cos((n-1)\theta) + \cos(n\theta) \cdot \sin((n-1)\theta)$$
$$= \sin(n\theta + (n-1)\theta)$$
$$= \sin((2n-1)\theta).$$

(6) A rotational angle sensor described in (5) above, further comprising a resolver-digital conversion section for converting to digital signals the resolver signal for the shaft angle multiplier of 1× and the resolver signal for the shaft angle multiplier of (2n−1)× output from the calculation section; and a synthesizing section for receiving digital signals output from the resolver-digital conversion section, and synthesizing an absolute angle signal therefrom.

The VR resolver according to the present invention comprises a rotor which includes first and second rotor portions axially superposed on each other or disposed on opposite sides of a plane including the center axis, the first rotor portion having n salient poles provided about a center axis at uniform angular intervals, where n is an arbitrary integer not less than 3, the second rotor portion having (n−1) salient poles provided about the center axis at uniform angular intervals; and a stator which has output coils arranged so as to output outputs for the shaft angle multiplier of n× and outputs for the shaft angle multiplier of (n−1)× in accordance with rotation of the rotor. This multi-pole configuration, which is hardly affected by eccentricity, suppresses influences of the eccentricity. That is, with increasing number of salient poles of the rotor, the number of poles of the signals output from the R/D conversion section increases. As a result, the slope of the triangular wave signal (mechanical angle–electrical angle signal) for each pole becomes steep, so that even when the detected electrical angle signals vary to some degree because of eccentricity, measured mechanical angle hardly change, whereby influences of the eccentricity can be suppressed.

In the rotational angel sensor of the present invention, the VR resolver is configured to enable calculation of a signal for the shaft angle multiplier of 1×; in particular, the rotor is configured to have two groups of salient poles provided such that the difference between the number of salient poles within one salient pole group and the number of salient poles within the other salient pole group is one. In addition, the calculation section calculates the signal voltage for the shaft angle multiplier of 1× from the output signal voltages provided by means of the two salient pole groups of the resolver. Therefore, the combination of the resolver and the calculation section enables production of a signal voltage for the shaft angle multiplier of 1×, and suppresses influence of eccentricity of the rotor with respect to the stator to thereby enable obtainment of a high-accuracy calculation signal for the shaft angle multiplier of 1×.

The rotational angle sensor of the present invention can derive a high-accuracy absolute position or angle from the detection signal for the shaft angle multiplier of 1×, which is obtained with high accuracy.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

A rotational angle sensor according to the present invention which performs double-speed angle detection will be described in detail with reference to the drawings. First, the characteristic features of the present invention will be described.

Feature 1: In contrast to the above-described conventional double-speed angle detector composed of two resolvers from which a 1× output and an n× output (n is arbitrary integer of 2 or greater) can be extracted, the rotational angle sensor according to the present invention is formed from a single resolver which includes a rotor having two types of salient poles which enable extraction of an n× output and an (n−1)× output, (where n is arbitrary integer of 3 or greater), to thereby enable generation of a 1× output signal.

Feature 2: In order to extract a 1× output from the outputs of the resolver described in Feature 1, a calculation which will be described below is executed so as to obtain, as the 1× output, a $K\sin\theta$ signal that varies in accordance with the rotational angle $\theta$.

Feature 3: The $K\sin\theta$ signal obtained in Feature 2 is subjected to R/D conversion so as to obtain the relation between the electrical angle and the mechanical angle for the shaft angle multiplier of 1×.

Feature 4: A 1× resolver signal, and an n× resolver signal, an (n−1)× resolver signal, or a (2n−1)× resolver signal are converted to digital signals so as to synthesize a single triangular wave signal, as well as successive n, (n−1), or (2n−1) triangular wave signals for each revolution (mechanical angle: 360 degrees).

Embodiment 1

Figure 1:
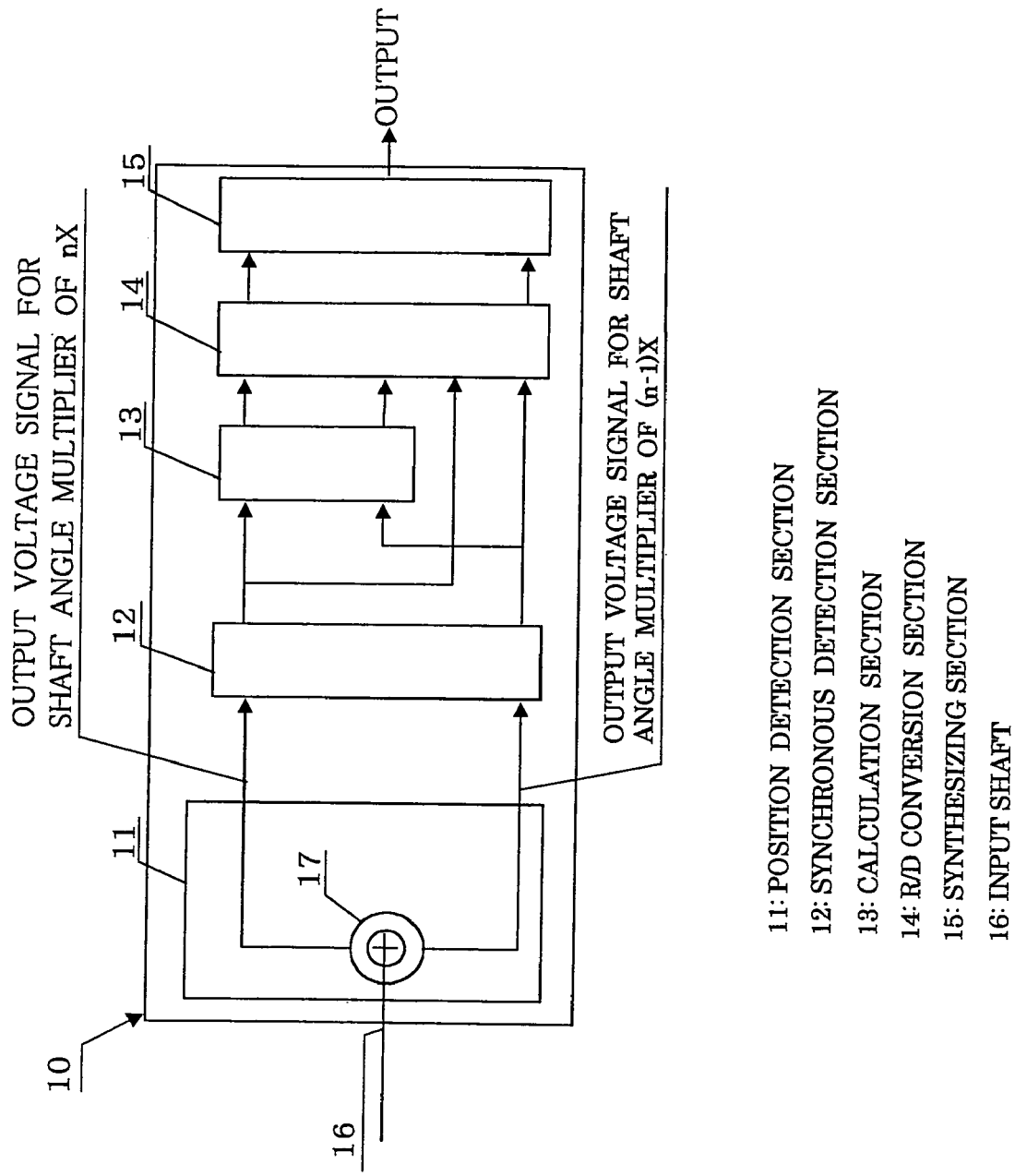
FIG. 1 is a block diagram of a rotational angle sensor according to the present invention.

FIG. 1 is a block diagram of a rotational angle sensor according to the present invention. A rotational angle sensor 10 includes a position detection section 11, a synchronous detection section 12, a calculation section 13, a resolver-digital (R/D) conversion section 14, and a synthesizing section 15. The rotational angle sensor 10 has a housing for accommodating these sections, from the position detection section 11 to the synthesizing section 15. Although the housing preferably assumes a sealed structure, the housing may assume an open structure in which one end of the housing is opened for assembly with a casing of counterpart equipment to which an input shaft 16 is connected. The synchronous detection section 12, the calculation section 13, the resolver-digital (R/D) conversion section 14, and the synthesizing section 15 are mounted on a circuit board as needed. Further, these sections are integrated into an IC (integrated circuit) as needed. The circuit board which carries components of these sections is disposed within the housing. Further, when necessary, the components on the circuit board are shielded so as to prevent noise from affecting detection signals from the position detection section 11.

The position detection section 11 is formed by a variable-reluctance (VR) resolver 17, which has the input shaft 16, and has a special configuration to be described later.

The synchronous detection section 12 performs synchronous detection for signal voltages output from output coils of the VR resolver 17 so as to remove excitation frequency components from the signal voltages, and outputs a signal voltage for a shaft angle multiplier of n× (hereinafter referred to as an n× signal voltage) and a signal voltage for a shaft angle multiplier of (n−1)× (hereinafter referred to as an (n−1)× signal voltage), which contain no excitation frequency component.

The calculation section 13 calculates a sinusoidal signal voltage which includes a $\sin\theta$ component for a shaft angle multiplier of 1×, in accordance with addition theorem in relation to sine (sin), which is a trigonometric function, on the basis of the n× signal voltage and the (n−1)× signal voltage.

Further, the calculation section 13 calculates a sinusoidal signal voltage which includes a $\sin(2n-1)\theta$ component for a shaft angle multiplier of (2n−1)×, in accordance with addition theorem in relation to sine, which is a trigonometric function, on the basis of the n× signal voltage and the (n−1)× signal voltage.

The resolver-digital (R/D) conversion section 14 converts to digital signals the signal voltages output from the synchronous detection section 12 and the calculation section 13.

The synthesizing section 15 performs the following calculation on the basis of the digital signals output from the resolver-digital (R/D) conversion section 14.

(a) The synthesizing section 15 obtains characteristics for the shaft angle multiplier of 1× (hereinafter referred to as "1× characteristics") and characteristics for the shaft angle multiplier of n× (hereinafter referred to as "n× characteristics"), the characteristics representing the relation between mechanical angle and electrical angle; and obtains a mechanical angle (absolute angle).

(b) The synthesizing section 15 obtains 1× characteristics and characteristics for the shaft angle multiplier of (n−1)× (hereinafter referred to as "(n−1)× characteristics"), the characteristics representing the relation between mechanical angle and electrical angle; correlates the 1× characteristics with the (n−1)× characteristics; and obtains a mechanical angle (absolute angle).

(c) The synthesizing section 15 obtains 1× characteristics and characteristics for the shaft angle multiplier of (2n−1)× (hereinafter referred to as "(2n−1)× characteristics"), the characteristics representing the relation between mechanical angle and electrical angle; correlates the 1× characteristics with the (2n−1)× characteristics; and obtains a mechanical angle (absolute angle).

Figure 2:
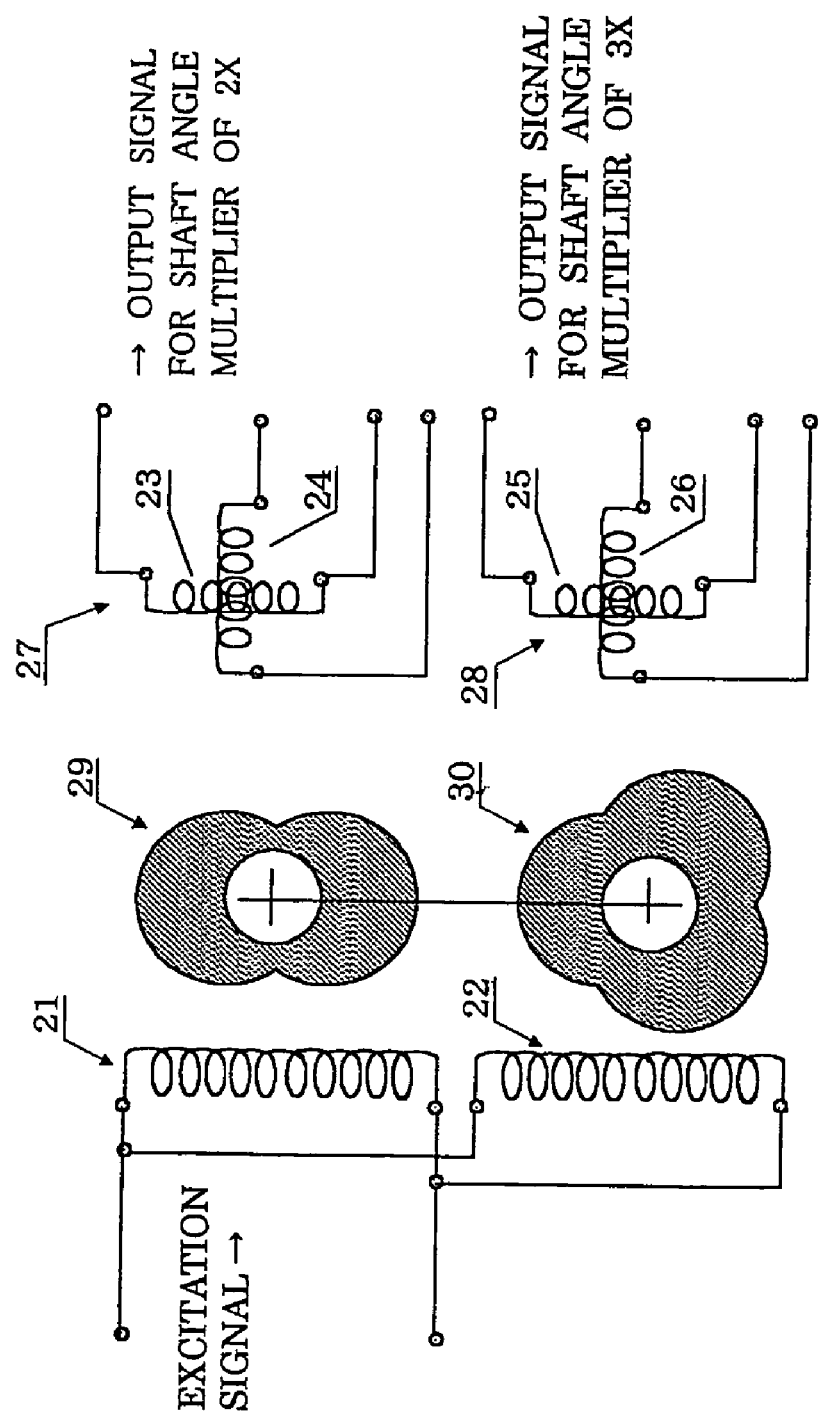
FIG. 2 is a schematic diagram showing a coil configuration of a resolver according to the present invention.

FIG. 2 is a schematic diagram showing the coil configuration of a resolver according to the present invention.

Figure 3:
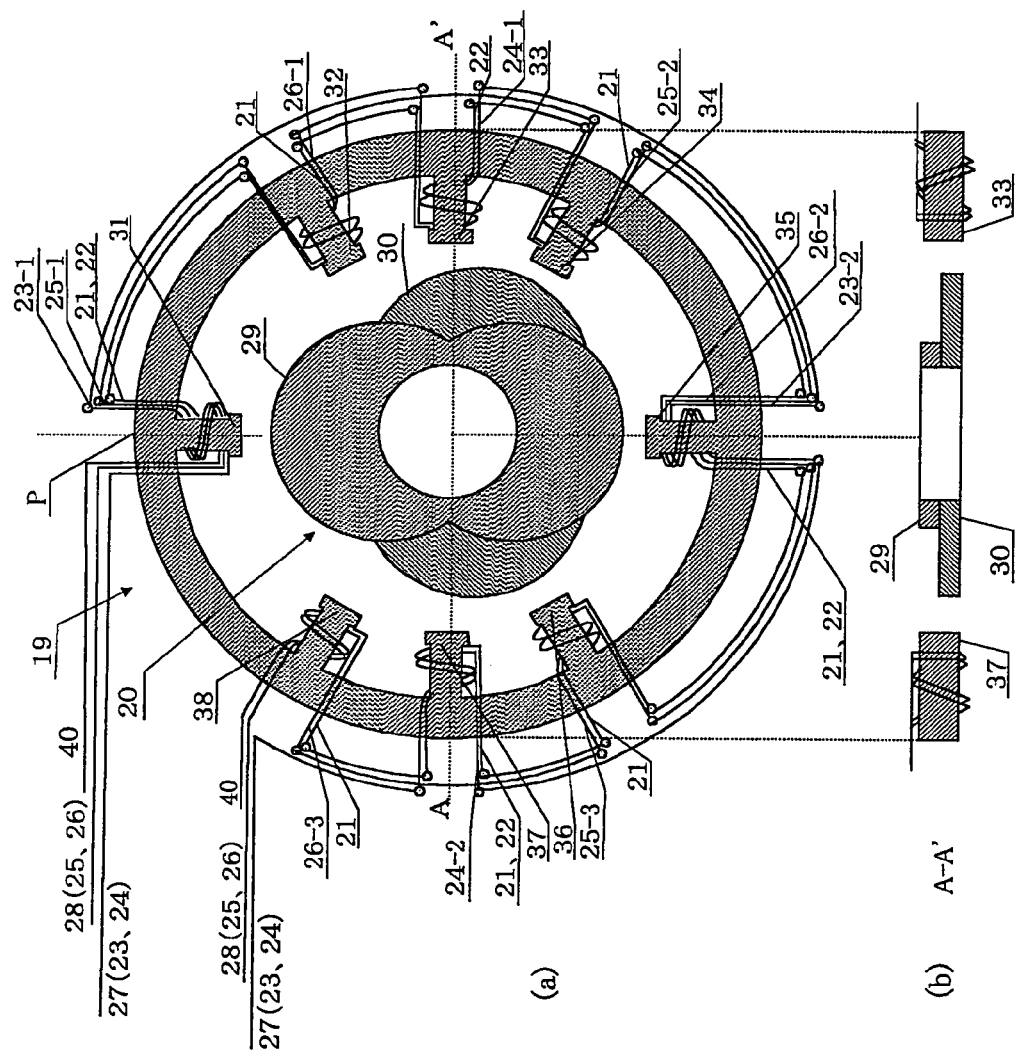
FIG. 3 is a schematic cross-sectional view of the resolver of FIG. 2.

FIG. 3 is a schematic cross-sectional view of the resolver of FIG. 2, wherein section (a) shows a transverse cross section, and section (b) shows a cross section taken along a line A–A' in section (a).

The position detection section 11 includes a stator 19 and a rotor 20. The rotor 20 includes two rotor portions; i.e., a 2× output rotor portion 29 having a salient pole shape for a shaft angle multiplier of 2×, and a 3× output rotor portion 30 having a salient pole shape for a shaft angle multiplier of 3×. The stator 19 has two excitation coils 21 and 22, and two output coil sets 27 and 28. The output coil set 27 outputs a voltage for the shaft angle multiplier of 2×, and the output coil set 28 outputs a voltage for the shaft angle multiplier of 3×. In this example, since n is set to 3, the shaft angle multiplier of 2× corresponds to the shaft angle multiplier of (n−1), and the shaft angle multiplier of 3× corresponds to the shaft angle multiplier of n.

The 2× output rotor portion 29, which has no coil, is formed of silicon steel and has two plate-shaped salient poles disposed symmetrically with respect to the center axis. The 3× output rotor portion 30, which has no coil, is formed of silicon steel and has three plate-shaped salient poles disposed at uniform angular intervals about the center axis. The 2× output rotor portion 29 and the 3× output rotor portion 30 are superposed on each other along the axial direction to thereby complete the rotor 20. The 2× output rotor portion 29 and the 3× output rotor portion 30 may be formed integrally; i.e., as a single member.

The stator 19 has magnetic poles 31, 33, 35, and 37 for the shaft angle multiplier of 2×, which are disposed at intervals of 90 degrees (mechanical angle), and magnetic poles 31, 32, 34, 35, 36, and 38 for the shaft angle multiplier of 3×, which are disposed at intervals of 60 degrees (mechanical angle). Since the magnetic poles 31 and 35 are commonly used for the shaft angle multiplier of 2× and the shaft angle multiplier of 3×, in total, eight magnetic poles are formed. However, magnetic poles totaling more than eight; for example, twelve magnetic poles, may be provided.

Different sets of coils for the shaft angle multiplier of 2× and the shaft angle multiplier of 3× are wound around the magnetic poles. Each coil set includes a sin output coil and a cos output coil wound at angular positions separated each other by 90 degrees (electrical angle).

The output coil set 27 for the shaft angle multiplier of 2× provided on the magnetic poles 31, 33, 35, and 37 of the stator 19 are combined with the 2× output rotor portion 29. The output coil set 27 includes a sin output coil 23 (consisting of coil segments 23-1 and 23-2) and a cos output coil 24 (consisting of coil segments 24-1 and 24-2), which are wound around the corresponding magnetic poles, while the magnetic pole 31 (zero point P) is used as a reference, and a phase difference of 90 degrees (electrical angle) is provided therebetween.

The output coil set 27 for the shaft angle multiplier of 2× outputs voltages represented by the following equations.

$$V1' = A \sin \omega t \cdot \sin 2\theta$$

$$V2' = A \sin \omega t \cdot \cos 2\theta$$

The output coil set 28 for the shaft angle multiplier of 3× provided on the magnetic poles 31, 32, 34, 35, 36, and 38 of the stator 19 are combined with the 3× output rotor portion 30. The output coil set 28 includes a sin output coil 25 (consisting of coil segments 25-1, 25-2, and 25-3) and a cos output coil 26 (consisting of coil segments 26-1, 26-2, and 26-3), which are wound around the corresponding magnetic poles, while the magnetic pole 31 (zero point P) is used as a reference, and a phase difference of 90 degrees (electrical angle) is provided therebetween.

The output coil set 28 for the shaft angle multiplier of 3× outputs voltages represented by the following equations.

$$V3' = B \sin \omega t \cdot \sin 3\theta$$

$$V4' = B \sin \omega t \cdot \cos 3\theta$$

The output voltages A sin 2θ and A cos 2θ for the shaft angle multiplier of 2× and the output voltages B sin 3θ and B cos 3θ for the shaft angle multiplier of 3× are supplied to the calculation section 13. Notably, the values of A and B are adjusted such that A=B.

The calculation section 13 performs the following calculation.

$$A\sin 3\theta \cdot A\cos 2\theta - A\cos 3\theta \cdot A\sin 2\theta$$
$$= A^2 \sin(3\theta - 2\theta)$$
$$= A^2 \sin\theta$$

Subsequently, the calculation section 13 converts the calculation result; i.e., $A^2 \sin \theta$, to $A \sin \theta$ having the initial amplitude, and outputs A sin θ. Thus, a resolver signal for the shaft angle multiplier of 1× can be obtained.

As described above, on the basis of the knowledge that provision of a plurality of salient portions enables generation of signals which are hardly affected by eccentricity of the center, the rotational angle sensor is designed to generate such favorable signals, and utilizes the signals so as to produce an output signal for the shaft angle multiplier of 1×; i.e., a sinusoidal wave signal whose period is 360 degrees (mechanical angle). That is, such a sinusoidal wave signal is produced from an n× resolver output signal and an (n−1)× resolver output signal, where n is an arbitrary integer of 3 or greater.

The R/D conversion section 14 receives the output voltage signal for the shaft angle multiplier of 1× output from the calculation section 13 and the n× resolver output signal or the (n−1)× resolver output signal output from the synchronous detection section 12 and, at each sampling time, converts them to R/D conversion output data values (digital signals).

In advance, the synthesizing section 15 obtains a triangular wave characteristic (mechanical angle-electrical angle characteristic, referred to as a "single-pole digital signal characteristic) which has a single peak for a rotational angle of 360 degrees (mechanical angle), from the R/D conversion output data value for the shaft angle multiplier of 1×. Further, the synthesizing section 15 obtains a triangular wave characteristic (mechanical angle-electrical angle characteristic, referred to as a "multi-pole digital signal characteristic) which has n or (n−1) peaks for a rotational angle of 360 degrees (mechanical angle), from the R/D conversion output data value for the shaft angle multiplier of n× or the shaft angle multiplier of (n−1). Subsequently, the synthesizing section 15 obtains a corresponding pole on the multi-pole digital signal characteristic from the R/D conversion output data value of the 1× resolver actually measured on the basis of the single-pole digital signal characteristic, and then obtains an angle (mechanical angle) from actually measured R/D conversion output data value of the n× resolver signal or (n−1)× resolver signal.

Second Embodiment

Also, the calculation section 13 obtains the 1× resolver signal by obtaining A sin θ as described in the first embodiment, and further, performs the following calculation while using the output of the synchronous detection section 12 in the first embodiment.

$$A\sin 3\theta \cdot A\cos 2\theta + A\cos 3\theta \cdot A\sin 2\theta$$
$$= A^2 \sin(3\theta + 2\theta)$$
$$= A^2 \sin 5\theta$$

Subsequently, the calculation section 13 converts the calculation result; i.e., $A^2$ sin 5θ, to A sin 5θ having the initial amplitude, and outputs A sin 5θ. Thus can be obtained a resolver signal for the shaft angle multiplier of 5×; a continuous voltage signal whose period is 360 degrees (mechanical angle) and which consists of 5 triangular wave segments whose period is 360/5 degrees.

The R/D conversion section 14 receives the output voltage signal for the shaft angle multiplier of 1× and the output voltage signal for the shaft angle multiplier of 5× output from the calculation section 13 and, at each sampling time, converts them to R/D conversion output data values (digital signals).

As described above, the R/D conversion section 14 produces high-accuracy digital signals by making use of signals which are produced on the basis of the knowledge that provision of a plurality of salient portions enables generation of signals which are hardly affected by eccentricity of the center.

In advance, the synthesizing section 15 obtains a triangular wave characteristic (a mechanical angle-electrical angle characteristic, referred to as "single-pole digital signal characteristic) which has a single peak for a rotational angle of 360 degrees (mechanical angle), from the R/D conversion output data value for the shaft angle multiplier of 1×. Further, the synthesizing section 15 obtains a triangular wave characteristic (a mechanical angle-electrical angle characteristic, referred to as "multi-pole digital signal characteristic) which has 5 peaks (i.e., (2n−1) peaks) for a rotational angle of 360 degrees (mechanical angle), from the R/D conversion output data value for the shaft angle multiplier of 5× (i.e., the shaft angle multiplier of (2n−1))×. Subsequently, the synthesizing section 15 obtains a corresponding pole on the multi-pole digital signal characteristic from the R/D conversion output data value of the 1× resolver signal actually measured on the basis of the single-pole digital signal characteristic, and then obtains an angle (mechanical angle) from actually measured R/D conversion output data value of the (2n−1)× resolver signal.

The above-described configuration enables production, from the R/D conversion signal, of a triangular wave signal which has a short period for the shaft angle multiplier of (2n−1)×, which signal cannot be produced by means of the salient poles of the n× resolver portion or the (n−1)× resolver portion. As a result, the slope of the triangular wave signal becomes steep, so that even when the detected electrical angle signals vary to some degree because of eccentricity, measured mechanical angle hardly changes, whereby an angle corresponding to an absolute position can be accurately measured.

Third Embodiment

Figure 4:
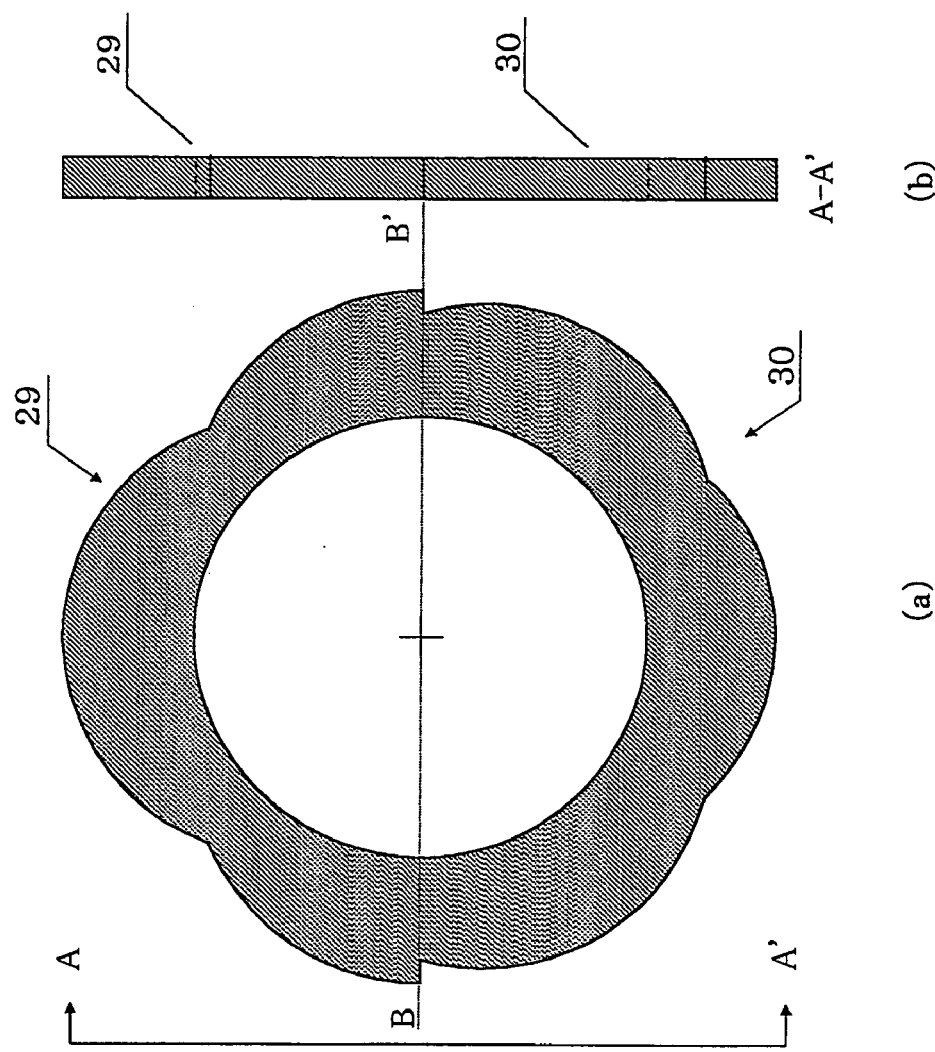
FIG. 4 is a view showing another example of a rotor of the resolver according to the present invention.
Figure 5:
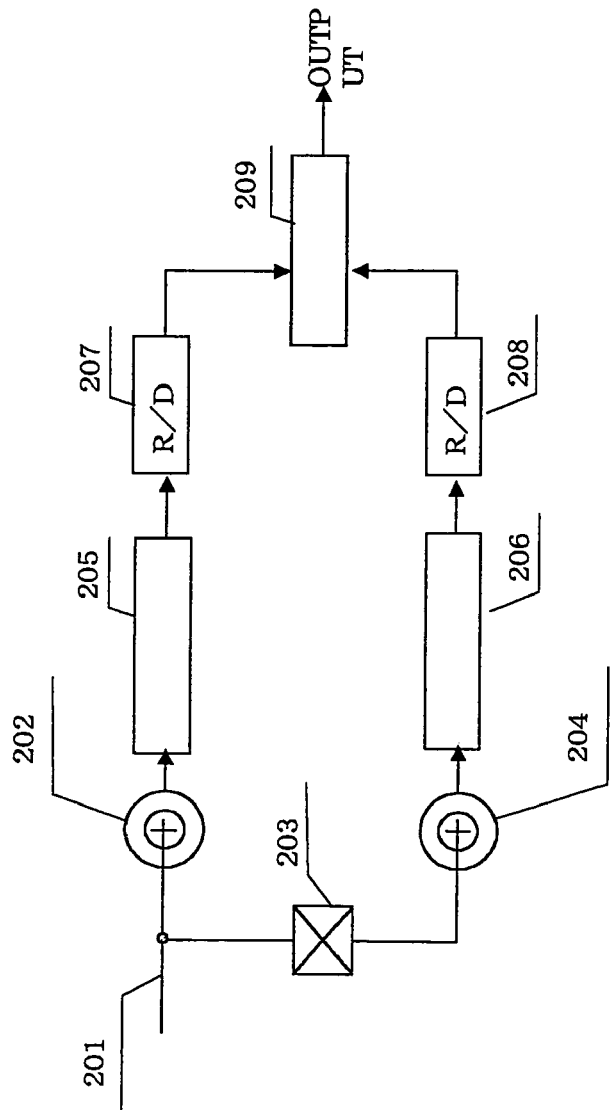
FIG. 5 is a block diagram of a conventional double-speed rotation detector which uses two resolvers.
Figure 6:
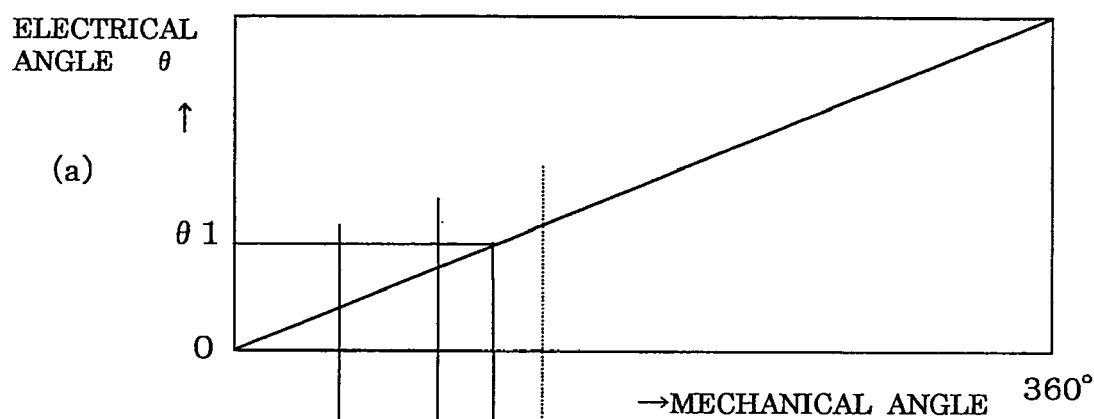
FIG. 6 shows output characteristics of the conventional double-speed rotation detector of FIG. 5.
Figure 6:
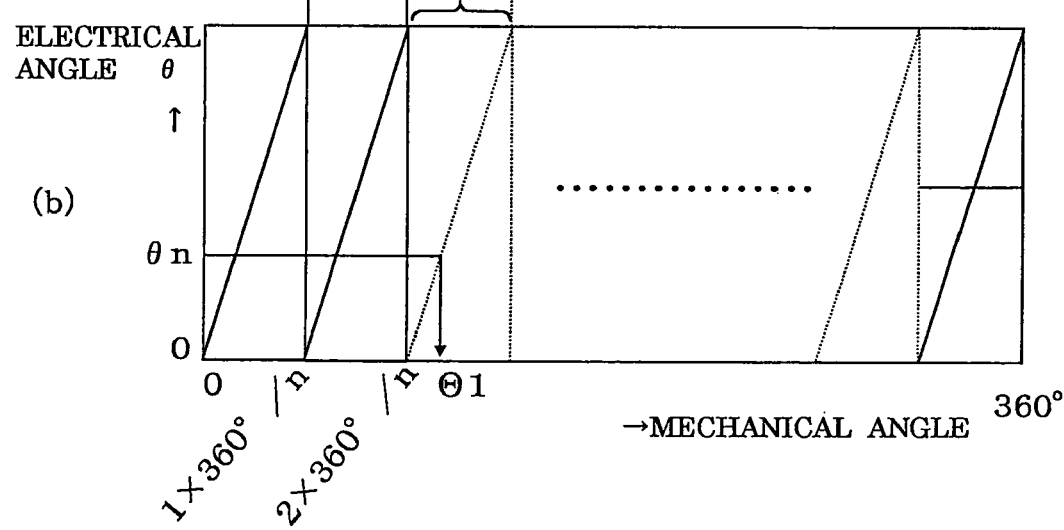

FIG. 4 is a view showing another example of the rotor of the present invention.

In the first embodiment shown in FIG. 3, the rotor is formed of a rotor portion having salient poles for the shaft angle multiplier of 2× and a rotor portion having salient poles for the shaft angle multiplier of 3×, which are superposed on each other. In the third embodiment, salient poles for the shaft angle multiplier of 2× and salient poles for the shaft angle multiplier of 3× are formed on a single annular plate such that the salient poles for the shaft angle multiplier of 2× are located on one side of a plane including the center axis, and the salient poles for the shaft angle multiplier of 3× are located on the other side of the plane. The salient poles for the shaft angle multiplier of 2× are formed in such a manner that a single complete salient pole is formed at the center and a half salient pole is formed on the left and right sides of the complete salient pole.

The numbers of salient poles formed on the opposite sides of the plane (i.e., within corresponding 180 degree ranges) may be set arbitrarily, so long as the difference between the numbers is 1.

The rotor of the third embodiment can be used in combination with the stator of FIG. 1.

The present invention can be applied to various apparatus, such as resolvers, rotation sensors, angle measurement devices, in which two or more sets of salient poles are provided so as to output a voltage signal for the shaft angle multiplier of n× and a voltage signal for the shaft angle multiplier of (n−1)×, and a voltage signal for the shaft angle multiplier of 1× is obtained from these voltage signals on the basis of the cosine theorem.

The number of salient poles in one group and the number of salient poles in the other group may be determined freely, so long as the first number is n and the second number is n−1, where n is an arbitrary integer of 3 or greater.

Obviously, numerous modifications and variations of the present invention are possible in light of the above teachings. It is therefore to be understood that within the scope of the appended claims, the present invention may be practiced otherwise than as specifically described herein.

What is claimed is:

1. A variable-reluctance resolver comprising:
a rotor including first and second rotor portions, the first rotor portion having n salient poles provided about a center axis at uniform angular intervals, where n is an arbitrary integer not less than 3, the second rotor portion having (n−1) salient poles provided about the center axis at uniform angular intervals; and
a stator having a plurality of magnetic poles provided on an inner circumferential surface thereof, an excitation coil provided on the magnetic poles, and output coils for shaft angle multipliers of n× and (n−1)× provided on the magnetic poles, the output coils outputting sine and cosine outputs which have a phase difference of 90 degrees therebetween.

2. A variable-reluctance resolver according to claim 1, wherein the first and second rotor portions are formed on opposite sides on a plane including the center axis.

3. A rotational angle sensor comprising:
a variable-reluctance resolver according to claim 1; and
a calculation section which receives sin(nθ) and cos(nθ) signals output from the resolver output coils for the shaft angle multiplier of n× and sin((n−1)θ) and cos((n−1)θ) signals output from the resolver output coils for the shaft angle multiplier of (n−1)×, and calculates a resolver signal for a shaft angle multiplier of 1× through the following calculation and outputs the calculated resolver signal:

$$\sin(n\theta) \cdot \cos((n-1)\theta) - \cos(n\theta) \cdot \sin((n-1)\theta)$$
$$= \sin(n\theta - (n-1)\theta)$$
$$= \sin\theta.$$

4. A rotational angle sensor according to claim 3, further comprising a resolver-digital conversion section for converting signals output from the calculation section to digital signals and converting a signal output from one of the resolver output coils to a digital signal; and a synthesizing section for receiving digital signals output from the resolver-digital conversion section, and synthesizing an absolute angle signal therefrom.

5. A rotational angle sensor according to claim 3, wherein the calculation section receives sin(nθ) and cos(nθ) signals output from the resolver output coils for the shaft angle multiplier of n× and sin((n−1)θ) and cos((n−1)θ) signals output from the resolver output coils for the shaft angle multiplier of (n−1)×, and calculates a resolver signal for a shaft angle multiplier of (2n−1)× through the following calculation and outputs the calculated resolver signal:

$$\sin(n\theta) \cdot \cos((n-1)\theta) + \cos(n\theta) \cdot \sin((n-1)\theta)$$
$$= \sin(n\theta + (n-1)\theta)$$
$$= \sin((2n-1)\theta).$$

6. A rotational angle sensor according to claim 5, further comprising a resolver-digital conversion section for converting to digital signals the resolver signal for the shaft angle multiplier of 1× and the resolver signal for the shaft angle multiplier of (2n−1)× output from the calculation section; and a synthesizing section for receiving digital signals output from the resolver-digital conversion section, and synthesizing an absolute angle signal therefrom.

* * * * *